United States Patent [19]

Hanks

[11] Patent Number: 4,770,281

[45] Date of Patent: Sep. 13, 1988

[54] OVERLOAD APPARATUS

[75] Inventor: James V. Hanks, Robbinsdale, Minn.

[73] Assignee: Horton Manufacturing Co., Inc., Minneapolis, Minn.

[21] Appl. No.: 28,247

[22] Filed: Mar. 20, 1987

[51] Int. Cl.$^4$ .................... F16D 7/06; F16D 43/286
[52] U.S. Cl. ........................ 192/56 F; 192/56 R; 192/85 CA; 464/35
[58] Field of Search ............ 192/56 R, 56 F, 85 CA; 464/35, 36

[56] References Cited

U.S. PATENT DOCUMENTS

| | | | |
|---|---|---|---|
| 1,274,722 | 8/1918 | Lacey | 464/35 |
| 2,401,992 | 6/1946 | Waller | |
| 2,475,518 | 7/1949 | Ristow | |
| 2,508,061 | 5/1950 | Fish | |
| 2,683,362 | 7/1954 | Bowman | |
| 2,837,190 | 6/1958 | Blakeslee | |
| 2,969,132 | 1/1961 | Stewart | |
| 3,012,645 | 12/1961 | Gensheimer et al. | |
| 3,050,321 | 8/1962 | Howe et al. | |
| 3,070,393 | 12/1962 | Silverberg et al. | |
| 3,177,740 | 4/1965 | Firestone et al. | |
| 3,298,488 | 1/1967 | McDonald | 192/56 F |
| 3,319,753 | 5/1967 | Orwin et al. | |
| 3,345,886 | 10/1967 | Jennings et al. | |
| 3,355,968 | 12/1967 | Sharples | |
| 3,405,789 | 10/1968 | Orwin et al. | |
| 3,552,026 | 1/1971 | Federoff | |
| 3,760,916 | 9/1973 | Hanks et al. | 192/67 R |
| 3,762,013 | 10/1973 | Irie | 29/200 P |
| 3,774,738 | 11/1973 | Steinhagen | 192/56 R |
| 4,220,230 | 9/1980 | Hansen | 192/56 R |
| 4,255,946 | 3/1981 | Hansen | |
| 4,262,785 | 4/1981 | Anderson et al. | 192/35 |
| 4,373,923 | 2/1983 | Kilwin | 464/36 |
| 4,386,689 | 6/1983 | Kato | 192/56 R |
| 4,541,512 | 9/1985 | Beasant et al. | 192/56 R |
| 4,548,305 | 10/1985 | Anderson | 192/56 R |
| 4,624,356 | 11/1986 | Hanks et al. | 192/85 CA |
| 4,633,991 | 1/1987 | Hanks et al. | 192/85 CA |
| 4,635,768 | 1/1987 | Hanks et al. | 192/30 W |

OTHER PUBLICATIONS

Ferguson/Autogard Torque Limiters Manual.
QRC ® Torque Limiter Quick Release Clutches Manual, ©4/84 TL 483 Zero-Max.
Ferguson/Rite-Torq Safety Coupling Manual, RT-69.
Advertisement for Ferguson/Rite-Torq ® II Torque Limiting Clutch, The Magazine of Industrial Motion and Control, p. 119, May 1981.
Winsmith/Wintorq II Couplings, Torque Limiting Overload Clutch.

Primary Examiner—Leslie A. Braun
Assistant Examiner—Richard M. Lorence
Attorney, Agent, or Firm—Peterson, Wicks, Nemer & Kamrath

[57] ABSTRACT

An overload apparatus is shown as an overload single position clutch having a drive ring which is reciprocated by springs and by a cylinder slideable on a piston by fluid pressure. The drive ring includes a multiplicity of ball receiving cavities. A sheave mount is further provided including an integral interface disc having a multiplicity of ball carrying cavities. Balls are captured within the ball carrying cavities by a ball cage secured to the mount. The ball cavities have diameters less than the balls and a shape and size such that the balls do not touch the closed ends or sidewalls of the cavities but rather the open ends form seats for the balls. The ball carrying cavities have diameters greater than the diameters of the ball receiving cavities to predispose the balls to cam out of the ball receiving cavities in the event of reaching a torque overload level. In another embodiment the balls are captured in the ball carrying cavities by constant diameter apertures formed in a carrier ring and a retaining plate, with the aperture diameters of the carrier ring being generally equal to that of the balls and with the aperture diameters of the retaining ring being less than that of the balls.

19 Claims, 1 Drawing Sheet

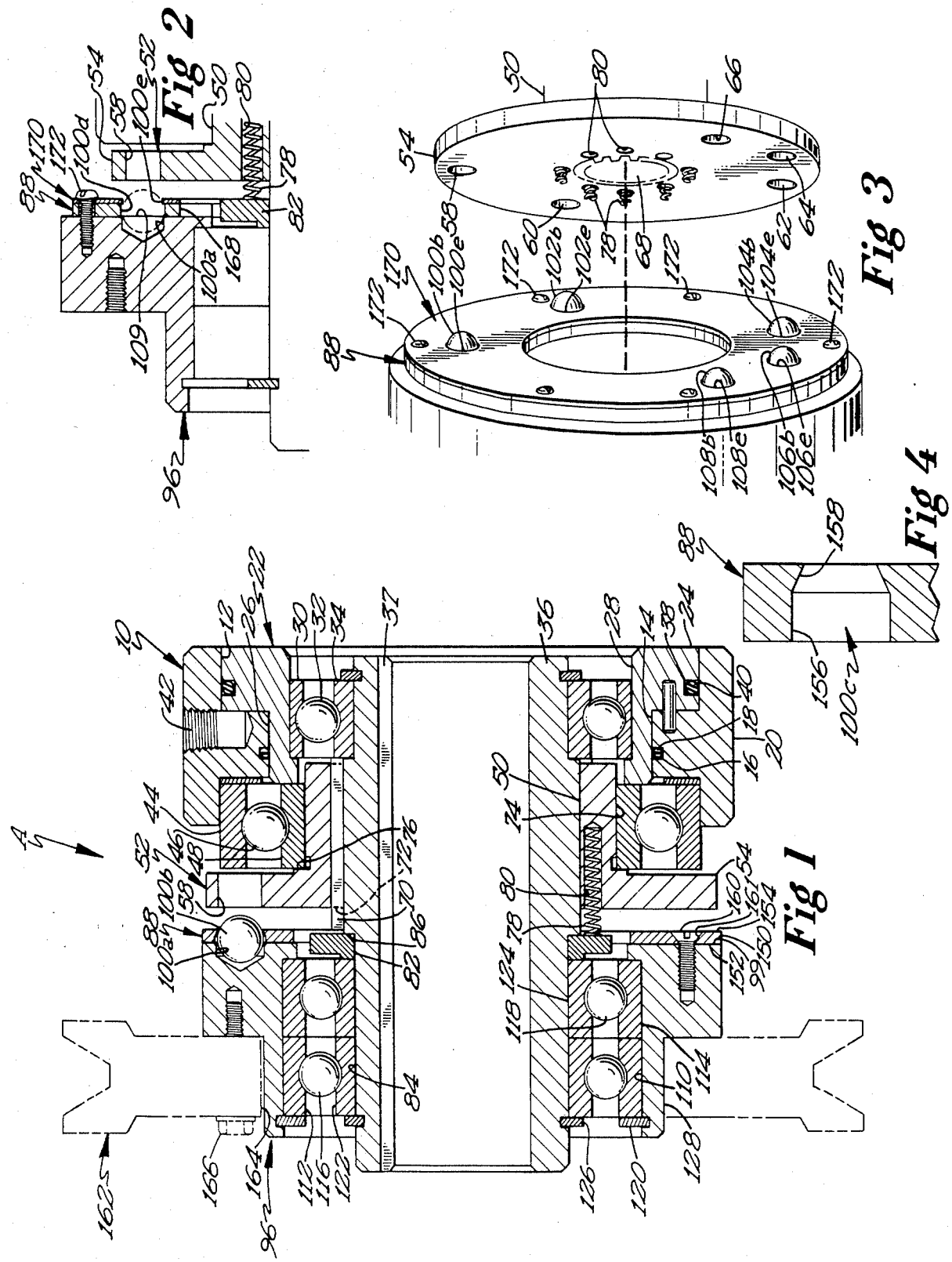

OVERLOAD APPARATUS

BACKGROUND

The present invention relates generally to overload apparatus where the output is disengaged from the input in the event of reaching a predetermined overload torque level, particularly, in its preferred form to an overload clutch, and specifically, in its most preferred form to an overload single position clutch.

It is often desirable to provide overload relief in the event that a predetermined torque level is reached when transferring power between an input and an output. Furthermore, it is often desired to provide a clutching action between the input and the output to selectively rotatably relate the input and output together. Further, it is often desired that the input always comes to the same degree(s) of registry for rotation of the output. The present invention in its most preferred form accomplishes all three of these functions in a single unit which is advantageous over prior apparatus which accomplished one or more of these functions. Specifically, such prior apparatus were generally of a complicated nature which were relatively expensive to manufacture, assemble, and service, encountered interface backlash problems, and were otherwise disadvantageous.

SUMMARY

The present invention solves this need in providing overload relief and solves the problems and disadvantages of prior apparatus by providing an overload apparatus including balls captured in ball carrying cavities of a first disc and for registry in or out of ball receiving cavities of a second disc. The ball carrying and ball receiving cavities have diameters less than the diameters of the balls and the ball receiving cavities have a diameter less than the diameter of the ball carrying cavities to bias ball cam out from the ball receiving cavities rather than the ball carrying cavities in the event of reaching a torque overload level.

In another aspect of the present invention, the balls are captured in the ball carrying cavities by a carrier ring having constant diameter apertures of a size for receipt of the balls and by a retaining plate having constant diameter apertures of a size less than the diameter of the balls. The carrier ring is sandwiched between the disc and the retaining plate with the balls extending through and beyond the apertures of the retaining plate.

It is thus an object of the present invention to provide an apparatus for providing overload relief in the event that a predetermined torque level is reached when transfering power between an input and an output.

It is further an object of the present invention to provide such an overload apparatus which is of a simple construction.

It is further an object of the present invention to provide such an overload apparatus which is easily manufactured and assembled.

It is further an object of the present invention to provide such an overload apparatus allowing easy maintenance of manufacturing tolerances.

It is further an object of the present invention to provide such an overload apparatus having a clutching action between the input and output.

It is further an object of the present invention to provide such an overload apparatus having a remotely controlled torque overload level.

It is further an object of the present invention to provide such an overload apparatus having input and output registry.

It is further an object of the present invention to provide such an overload apparatus allowing standardization of components.

It is further an object of the present invention to provide such an overload apparatus allowing standard design which may be modified according to the particular application.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 1 a cross sectional view of a preferred form of an overload apparatus according to the teachings of the present invention.

FIG. 2 shows a fragmentary, sectional view of an alternate embodiment of an overload apparatus according to the teachings of the present invention.

FIG. 3 shows an exploded perspective view of the overload apparatus of FIG. 2.

FIG. 4 shows an enlarged sectional view of a component of the overload apparatus of FIG. 1.

All figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms 'axial', 'end', 'circumferential', 'sidewalls', 'first', 'second', and similar terms are used herein, it should be understood that these terms have reference only to the structure shown in the drawings as it would appear to a person viewing the drawings and are utilized only to facilitate describing the invention.

DESCRIPTION

Referring to the drawings in detail, an overload single position clutch is shown according to the preferred teachings of the present invention and generally designated A. Clutch A includes the stationary cylinder 10 formed with the internal annular surface 12 and the reduced diameter annular surface 14. Formed in the cylinder surface 14 is the annular recess 16 in which is positioned the O-ring 18. The cylinder 10 also includes the annular flange 20. Further provided is the annular piston 22 formed with the major diameter portion 24 and the reduced diameter portion 26. The piston 22 is formed with the annular recess 28 in which is press fit the outer race 30 of the bearing 32. The inner race 34 of the bearing 32 is press fit on the rotatable hub 36 formed with the internal keyway 37. The outer surface of the piston portion 24 is formed with the annular recess 38 in which is positioned the O-ring 40 which makes sealing engagement with the cylinder 10. The O-ring 18 makes sealing engagement with the piston portion 26.

The numeral 42 designates an inlet which allows fluid pressure to enter the cylinder by conventional means. The outer race 44 of bearing 46 is mounted within the cylinder flange 20 and the inner race 48 is press fit upon the splined sleeve 50 of the circular drive ring 52 which is the preferred form of an interface disc of clutch A according to the teachings of the present invention. The sleeve 50 terminates in the radially disposed annular flange 54. Formed adjacent but radially inward of the periphery and extending generally perpendicularly to the inner face of the annular flange 54 and axially through annular flange 54 are the five spaced ball-receiving cavities 58, 60, 62, 64, and 66 having generally cylindrical shape.

The flange 54 of the drive ring 52 is formed with a central opening 68 which coincides with the inner surface of the sleeve 50, and formed on the inner surface of the flange and the sleeve are the splines 70 which slidably engage with the splines 72 formed on the hub 36 thereby allowing the drive ring to slide axially on the hub. The inner race 48 of the bearing 46 is press fit in the annular recess 74 of the sleeve 50 of the drive ring and the race 48 abuts the shoulder 76 of the drive ring formed by the recess 74. Thus as the cylinder 10 is moved axially on the piston 22 the cylinder moves the bearing 46 axially which in turn carries with it the drive ring 52 slidably splined upon the hub 36 as described.

The drive ring 52 is urged against axial movement by means of a multiplicity of coil springs 78 mounted in bores 80 formed in the sleeve 50, the outer ends of the springs abutting the back up washer 82 mounted on the hub 36 and the inner ends of the springs abutting the inner ends of the bores 80. The washer 82 is mounted in the recess 84 formed on the hub and abuts the shoulder 86 formed by the recess 84.

The mount 96 has formed therein the annular recess 110 in which the outer races 112 and 114 of the bearings 116 and 118, respectively, are press fit and held therein by the lock ring 120. The inner races 122 and 124 are press fit in the recess 84 and abutting the washer 82 and held in position by the lock ring 126. Mount 96 includes the integrally formed interface disc of clutch A according to the preferred teachings of the present invention and has formed therein the annular recess 128 on which a sheave 162 may be mounted for driving of the same. In the most preferred form, sheave 162 includes an inner opening 164 having a size and shape complementary to and for receipt on mount 96. Sheave 162 is held in the same rotational position as mount 96 by bolts 166 axially extending through sheave 162 and threadably received in mount 96. It can then be appreciated that mount 96 may include a break away connection of the type shown and described in U.S. Patent 4,635,768.

For purposes of selectively engaging and relating drive ring 52 to mount 96, balls 100b, 102b, 104b, 106b, and 108b are provided mounted to the inner face 99 of mount 96 which is arranged substantially adjacent and parallel to the inner face of drive ring 52. In the preferred teachings of the present invention, balls 100b-108b are mounted by complementary axially extending, ball carrying cavities or socket portions 100a, and ball cage 88. Socket portions 100a extend generally perpendicularly from inner face 99 of mount 96 and are generally cylindrical in shape having a first circular end 109 having a diameter less than balls 100b-108b and a length sufficient such that balls 100b-108b seated in ends 109 of socket portions 100a do not engage the opposite end of socket portions 100a. In the preferred form, the diameters of socket portions 100a are greater than the diameters of ball-receiving cavities 58-66.

In a first preferred form, ball cage 88 for capturing balls 100b-108b within socket portions 100a according to the teachings of the present invention is formed from a ball seat 150 having a first face 152 for abutment with the inner face 99 of mount 96 and having an opposite face 154. Ball seat 150 includes apertures 100c, corresponding to socket portions 100a for receiving and holding balls 100b-108b in socket portions 100a. In the most preferred form, apertures 100c include a first, cylindrical portion 156 extending from face 152 and having a diameter generally equal to but slightly larger than the diameter of balls 100b-108b and a second portion 158 extending from portion 156 and terminating in face 154. In the most preferred form, portion 158 is frustoconical in shape having a diameter equal to the diameter of portion 156 at their intersections and decreasing to a diameter at face 154 which is less than the diameter of balls 100b-108b. The respective lengths of portions 156 and 158 should then allow balls 100b-108b to be received in socket portions 100a and apertures 100c with face 152 abutting with face 99 of mount 96 and with balls 100b-108b being generally captured in a seating manner with socket portions 100a and specifically allowing balls 100b108b to roll but not allowing balls 100b-108b to clatter during rotation of mount 96 and disengagement from drive ring 52. The balls 100b-108b are mounted on the flange mount 96 by placing the balls first in the apertures 100c. Next the combination and the balls thereof are placed in the partial complementary socket portions 100a and ball seat 150 secured to the mount 96 by screws 160 thereby mounting the balls on the mount 96. Screws 160 may be received in openings 161 having countersunk entries to allow screws 160 to be located circumferentially intermediate socket portions 100a in the interface area of balls 100b-108b and not interfere with the inner face of drive ring 52.

In a second preferred form, ball cage 88 according to the teachings of the present invention is formed from a carrier ring 168 and a retaining plate 170. Carrier ring 168 includes apertures 100d, corresponding to socket portions 100a and having diameters generally equal to but slightly larger than the diameter of balls 100b-108b for receiving balls 100b-108b therein. Retaining plate 170 includes apertures 100e, 102e, 104e, 106e, and 108e corresponding to socket portions 100a and apertures 100d and having a diameter less than the diameter of balls 100b-108b. Carrier ring 168 is sandwiched between inner face 99 of mount 96 and plate 170 and the combination is secured to mount 96 by screws 172. The thickness of carrier ring 168 should then allow balls 100b-108b to be received in socket portions 100a and apertures 100d and captured therein by plate 170 with balls 100b-108b extending through and beyond apertures 100e-108e of plate 170 and not allowing balls 100b-108b to clatter during rotation of mount 96 and disengagement from drive ring 52.

The hub 36 is keyed to the shaft of a motor not shown whereby the drive ring 52 is rotated. Fluid pressure is introduced into the inlet 42 thereby causing the cylinder 10 to move axially and cause the drive ring 52 to also move axially as it rotates whereby the cavities 58-66 seek register with balls 100b-108b. Generally speaking, with register of the cavities with the balls, the mount is rotated. Torque force is not created until full registry of the balls and once there is engagement all torque is taken by the balls. It will be seen that all five balls are either in or out of engagement and when not in engagement there is planar support for the drive ring. It will be further seen that with the positioning of the balls as set forth herein there are always three balls in a triangle containing the axis of the clutch with engagement of portions of the member between the cavities along the path to support the drive rin before engagement of the balls with the cavities and there is negligible torque output during the seeking of the balls by the cavities.

The subtle details of the preferred relationship of cavities 58-66 and balls 100b-108b are set forth and expanded upon in U.S. Pat. No. 3,760,916 which is hereby incorporated herein by reference.

Now that the construction of clutch A according to the teachings of the preferred embodiment of the present invention has been set forth, subtle features and advantages of the preferred construction of the present invention can be appreciated. It can then be appreciated that clutch A in an engaged position includes a torque overload level where balls 100b-108b cam out of cavities 58-66. This torque overload level depends upon several factors. First, this torque overload level is dependent upon the spring and fluid pressure forces placed upon drive ring 52 by springs 78 and cylinder 10, which then depend upon various design parameters. However, it should be also appreciated that for the same unit of clutch A according to the teachings of the present invention, the torque overload level may be remotely varied by simply varying the fluid pressure introduced into inlet 42 such as by the utilization of a variable pressure valve.

Second, this torque overload level is dependent upon the sizes and interrelationships of balls 100b-108b and cavities 100a and 58-66. It can then be appreciated that the camming action of balls 100b-108b out of cavities 58-66 is directly dependent upon the depth that balls 100b-108b extend into cavities 58-66, with the greater depth, i.e. approaching the equator of balls 100b-108b requiring the greatest torque level to remove balls 100b-108b from cavities 58-66 and with lesser depths requiring lesser torque levels to remove balls 100b-108b from cavities 58-66. It can then be appreciated that the torque overload level may then be varied by the choice of the sizes of balls 100b-108b and cavities 100a and cavities 58-66; however to allow standardization of components, it can be appreciated that clutch A can be of a standard design aside from the diameters of cavities 58-66 which may be drilled to the size to achieve the desired torque overload level according to the particular application.

It can then be appreciated that clutch A according to the teachings of the present invention achieves interface antibacklash features as the result of the preferred construction. Backlash is the loss of motion due to play in the parts during reversal in motion direction. Particularly, cavities 58-66 and 100a have diameters less than balls 100b-108b and have lengths such that balls 100b-108b do not touch the ends as well as the sidewalls of cavities 58-66 and 100a. Further, cavities 58-66 and 100a include only a small chamfer necessary to protect the corners during heat treating. This helps insure that balls 100b-108b are wedged in cavities 58-66 and 100a and cam against corners of cavities 58-66 such that balls 100b-108b do not touch the sidewalls of cavities 58-66 and 100a which could result in backlash and also allows for maintaining the desired tolerances in the cam forcing necessary to remove balls 100b-108b from cavities 58-66 and 100a in manufacture.

It can then be appreciated that the ball cage 88 formed from carrier ring 168 and plate 170 is further advantageous in regard to manufacture. Specifically, it can then be appreciated that apertures 100d and 100e-108e can be easily repeated in manufacture as they are through apertures which do not require depth control of any nature to be held for tolerance purposes. Thus, the lack of depth tolerances greatly reduce the cost of manufacture while still meeting torque tolerances.

Further, it should be appreciated that the relationships taught by the present invention for the diameters of cavities 58-66 and 100a are advantageous. Particularly, since the diameters of cavities 100a-108a are larger than the diameters of cavities 58-66, balls 100b-108b are received or seated at a greater depth in cavities 100a-108a than in cavities 58-66. As set forth, the greater the depth of receipt of balls 100b14 108b, the greater the level of the torque required for balls 100b-108b to cam out of the cavities. Therefore, greater torque is required to cam balls 100b-108b out of cavities 100a than to cam balls 100b-108b out of cavities 58-66. Thus, in an overload situation, balls 100b-108b will tend always to cam out of cavities 58-66 such that minimal torque load is placed upon ball cage 88 and its securement to mount 96. In fact, a major purpose of ball cage 88 is to retain balls 100b-108b adjacent to mount 96 during disengagement, especially in a vertical clutch orientation. For purposes of illustration, in a preferred form of the present invention, a diameter of 0.456 inches (1.158 cm) for cavities 58-66 and a diameter of 0.484 inches (1.229 cm) for cavities 100a has been found to achieve the desired ball cam out characteristics for balls 100b-108b having diameters of 0.500 inches (1.270 cm). Thus, it can be appreciated that the side of the interface which balls 100b-108b are released from can be biased by design in the selection of the diameters of the cavities.

Additionally, it should be appreciated that a crisp release may be achieved in the event of reaching a torque overload level according to the teachings of the present invention. Specifically, prior overload apparatus utilized springs to bias the interface discs together. Thus, in overload situations, it was necessary for the springs to be compressed in order to allow for interface separation in such prior overload apparatus. The compression of the springs result in an increase in force preventing separation of the interface discs, such that a "toe hold" may exist to prevent or delay release. Utilizing clutch A according to the teachings of the present invention having a pressure self relieving regulator does not result in increasing interface separation force as the interface discs separate resulting in a crisp release in the event of reaching a torque overload level without the "toe hold" effect of prior spring biased overload apparatus. Furthermore, a limit switch may be mechanically secured to drive ring 52 to dump fluid from inlet 42 in the event of drive ring 52 movement as the result of overload to further assist a crisp release and to prevent automatic reset of clutch A according to the teachings of the present invention.

Now that the basic teachings of the present invention have been explained, many extensions and variations will be obvious to one having ordinary skill in the art.

For example, although the output is shown in its preferred form as mount 96 of the pilot type and the input is shown in its preferred form as hub 36 for receipt of a shaft, other forms and types of output and input may be utilized according to the teachings of the present invention.

Similarly, although the present invention has been disclosed in its most preferred form in a clutching environment and is believed to be particularly advantageous, an overload apparatus may be constructed according to the teachings of the present invention which is not of the clutching variety.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Overload apparatus comprising, in combination: a first disc having an inner face; a second disc having an inner face, with the inner face of the second disc being substantially adjacent and parallel to the inner face of the first disc; at least one ball having a diameter; a ball carrying cavity for each ball formed in the first disc extending axially of the inner face of the first disc, with the ball carrying cavity having a diameter, with the diameter of the ball being greater than the diameter of the ball carrying cavity; means for capturing the ball within the ball carrying cavity; and a ball receiving cavity for each ball formed in the second disc extending axially of the inner face of the second disc, with the ball receiving cavity having a diameter less than the diameter of the ball and less than the diameter of the ball carrying cavity whereby the ball cams out of the ball receiving cavity rather than from the ball carrying cavity in the event of reaching a torque overload level.

2. The overload apparatus of claim 1 wherein the ball carrying and ball receiving cavities are generally cylindrical in shape having sidewalls and ends opposite the inner faces of the discs, with the sidewalls having a length such that the ball does not contact the ends of the cavities.

3. The overload apparatus of claim 2 wherein the sidewalls of the cavities intersect generally perpendicularly with the inner faces of the discs for ease in maintaining manufacturing tolerances in the areas of backlash control and ball camming force requirements.

4. The overload apparatus of claim 1 wherein the ball capturing means comprises, in combination: a ball seat having a thickness, a first face for abutment with the inner face of the first disc and a second face; and means for securing the ball seat to the first disc, with the ball seat having an aperture for each of the balls, with the aperture having a diameter at its first face of a size for receipt of the diameter of the ball and having a diameter at its second face less than the diameter of the ball, with the thickness of the ball seat allowing the ball captured within the ball carrying cavity and the aperture of the ball seat to extend through the aperture of the ball seat beyond the second face of the ball seat.

5. The overload apparatus of claim 4 wherein the aperture of the ball seat comprises, in combination: a first, cylindrical portion extending from the first face towards the second face having a diameter for receipt of the diameter of the ball; and a second portion extending from the first portion to the second face, with the second portion having a diameter which decreases from a diameter generally equal to the diameter of the first portion to the second face diameter.

6. The overload apparatus of claim 5 wherein the second portion is frustoconical in shape.

7. The overload apparatus of claim 5 wherein the securement means comprise screws extending through the ball seat and threadably received in the first disc, with the screws being located circumferentially intermediate the ball carrying cavities, with the screws being countersunk in the ball seat to be flush with the second face of the ball seat to avoid interaction with the inner face of the second disc when the balls are received in the ball receiving cavities of the second disc.

8. The overload apparatus of claim 1 wherein the ball capturing means comprises, in combination: a carrier ring; a retaining plate; and means for securing the carrier ring and the retaining plate to the first disc with the carrier ring sandwiched between the retaining plate and the first disc, with the carrier ring including an aperture for each of the balls having a constant diameter for receipt of the ball, with the retaining plate including an aperture for each of the balls having a constant diameter less than the diameter of the ball, with the ball captured within the ball carrying cavity and the apertures of the carrier ring and retaining plate extending through and beyond the aperture of the retaining plate.

9. The overload apparatus of claim 1 further comprising, in combination: means for selectively separating the first and second discs from a first condition where the ball carried by the first disc engages with the ball receiving cavity of the second disc to a second condition where the ball carried by the first disc is rotationally isolated from the ball receiving cavity of the second disc.

10. The overload apparatus of claim 9 wherein the selectively separating means comprises, in combination: means for reciprocally mounting the second disc for movement between a first position and a second position; means for biasing the second disc in its first position; and means for moving the second disc to its second position against the bias of the biasing means.

11. The overload apparatus of claim 10 wherein the moving means comprises, in combination: a piston slidably mounting a cylinder for receipt of fluid pressure causing axial movement therebetween.

12. The overload apparatus of claim 1 wherein the ball carrying and ball receiving cavities are arranged so that in one position the balls overlie the ball receiving cavities for registry and in any other position at least three balls form a triangle containing the axis of the overload apparatus and engage the inner face of the second disc between the ball receiving cavities.

13. The overload apparatus of claim 12 wherein the angles between a certain ball and its corresponding ball receiving cavity and the successive balls and cavities are substantially 0°, 40°, 170°, 190°, and 250°.

14. Overload apparatus comprising, in combination: a first disc having an inner face; a second disc having an inner face, with the inner face of the second disc being substantially adjacent and parallel to the inner face of the first disc; at least one ball having a diameter; a ball carrying cavity for each ball formed in the first disc extending axially of the inner face of the first disc, with the ball carrying cavity having a diameter, with the diameter of the ball being greater than the diameter of the ball carrying cavity; a ball receiving cavity for each ball formed in the second disc extending axially of the inner face of the second disc; a carrier ring; a retaining plate; and means for securing the carrier ring and the retaining plate to the first disc with the carrier ring sandwiched between the retaining plate and the first disc, with the carrier ring including an aperture for each of the balls having a constant diameter for receipt of the diameter of the ball, with the retaining plate including an aperture for each of the balls having a constant diameter less than the diameter of the ball, with the ball captured within the ball carrying cavity and the apertures of the carrier ring and retaining plate extending through and beyond the aperture of the retaining plate.

15. The overload apparatus of claim 14 wherein the ball carrying and ball receiving cavities are generally cylindrical in shape having sidewalls and ends opposite the inner faces of the discs, with the sidewalls having a length such that the ball does not contact the ends of the cavities.

16. The overload apparatus of claim 15 wherein the sidewalls of the cavities intersect generally perpendicularly with the inner faces of the discs for ease in maintaining manufacturing tolerances in the areas of backlash control and ball camming force requirements.

17. The overload apparatus of claim 16 wherein the ball receiving cavity has a diameter less than the diameter of the ball and less than the diameter of the ball carrying cavity whereby the ball cams out of the ball receiving cavity rather than from the ball carrying cavity in the event of reaching a torque overload level.

18. The overload apparatus of claim 14 further comprising, in combination: means for selectively separating the first and second discs from a first condition where the ball carried by the first disc engages with the ball receiving cavity of the second disc to a second condition where the ball carried by the first disc is rotationally isolated from the ball receiving cavity of the second disc.

19. The overload apparatus of claim 18 wherein the selectively separating means comprises, in combination: means for reciprocally mounting the second disc for movement between a first position and a second position; means for biasing the second disc in its first position; and means for moving the second disc to its second position against the bias of the biasing means.

* * * * *